E. S. M. FERNALD.
Friction-Clutch.
No. 160,264.            Patented March 2, 1875.
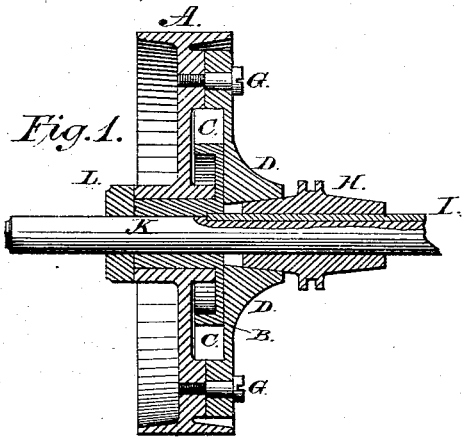
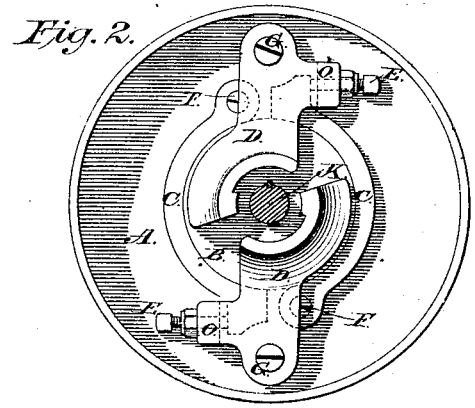
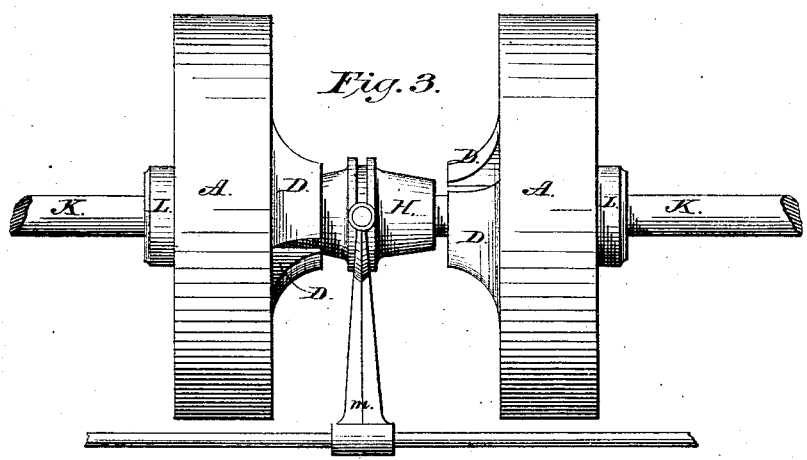
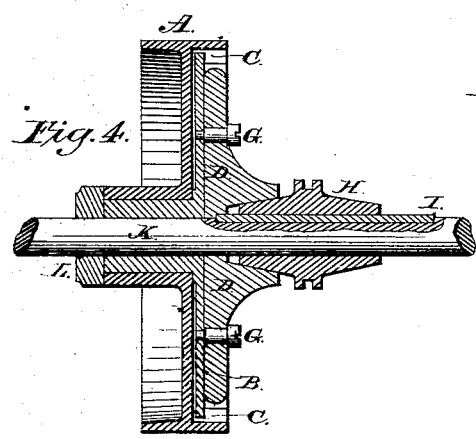
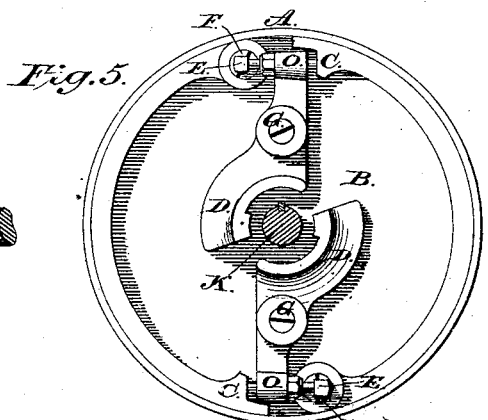
Attest:
Ferdinand W. Guptill
Richard S. H. Grant
Inventor:
Edward S. M. Fernald.
By Jos. S. Moody, Attorney.

UNITED STATES PATENT OFFICE.

EDWARD S. M. FERNALD, OF SACO, MAINE.

IMPROVEMENT IN FRICTION-CLUTCHES.

Specification forming part of Letters Patent No. 160,264, dated March 2, 1875; application filed January 8, 1875.

*To all whom it may concern:*

Be it known that I, EDWARD S. M. FERNALD, of Saco, State of Maine, have invented a new and useful Improvement in Mechanism for Starting, Stopping, and Reversing Rotary Motion; and I do hereby declare that the following is a full, true, and exact description thereof, reference being had to the drawings accompanying and forming a part of this specification, in which—

Figure 1 is a sectional view of a pulley with my improvement attached. Fig. 2 is a face view of the same. Fig. 3 is a view of two pulleys with my improvement placed on a shaft, and a shipping-rod. Figs. 4 and 5 are sectional and face views of the same mechanism operating reversely, as will be more fully set forth in this specification.

The letters of reference are the same in each view.

The pulley A fits and runs loosely on the flanged bushing B, which flanged bushing is secured to the shaft K by means of the key I, or by any known method. The flange of this bushing is made with a recess admitting the hub of the pulley. C C are two ring-segments, which are secured at one end to the pulley A by means of the screws F F. The concave surfaces of these ring-segments, as shown in Figs. 1 and 2, are fitted loosely upon the flange of the bushing B, and the free ends are in contact with the points of the adjusting-screws E E, which screws pass through bosses O O on the levers D D. The screws G G secure the levers in place, and serve as fulcrums on which they move. The concave ends of the levers are made to fit the sleeve H, which sleeve has a free lateral movement upon the shaft, and may be left to turn loosely on said shaft, or may be secured thereon by a key, I, or by any known method. This sleeve is operated by means of the forked shipper-rod M. The pulleys are held in position by the collars L L and the key I, which key enters part way into the flanged bushing. When two pulleys with my improved mechanism attached are placed on a shaft, as shown in Fig. 3, with driving-belts thereon, as is customary, viz., on one pulley an open and on the other a crossed belt, and motion is given to the pulleys, the flanged bushings B B and the shaft are at rest. When, by means of the shipper-rod M, the sleeve H is thrust into and between the levers D D, forcing them outward, the outward movement being controlled by the fulcrum-screws G G, this movement of the levers causes the bosses O O, with adjusting-screws E E, to press against the free ends of the ring-segments C C, forcing them inward, and causing them to tightly clasp the flanged bushing, thereby making the motion of the bushing, and, consequently, that of the shaft, depend upon the motion of the pulley. On withdrawing the sleeve, the pulley runs, as before, loosely upon the bushing, which is then at rest. When both pulleys are used—one with an open and the other with a crossed belt—the motions of the pulleys are in opposite directions, and by thrusting the sleeve alternately from contact with one pulley to contact with the other the motion of the shaft is reversed, said motion being controlled and directed in this form of application by the friction of the ring-segments upon the flanged bushing B. If it is desirable that the pulley should run upon the shaft in preference to running on a bushing, the bushing may be dispensed with and the flange secured to the shaft by any known method; but, in such case, the flange should be made with a sufficient bearing to keep it in position and render its attachment to the shaft secure.

In Figs. 4 and 5 another form of application of my device is shown, in which the flange of the bushing B is made to cover, or nearly cover, the web of the pulley. The ring-segments C C are secured to the flange of the bushing at or near its outer edge, and have their convex surfaces fitted to bear evenly and squarely against the rim of the pulley. The bosses O O on the levers are, in this case, placed at the outer end, and adjusted to contact with the free ends of the ring-segments. On forcing the sleeve H into and between the concave ends of the levers D D, the ring-segments are caused to press more or less firmly against the rim of the pulley, thereby imparting the motion of the pulley to the flanged bushing, and so to the shaft. This form of construction and operation is essentially equivalent to that shown and described in Figs. 1 and 2, the several parts being of similar form and similarly operated. This form of construction is especially designed for very large wheels, where large frictional contact is necessary, as well as for very small wheels, where the limited space within the diameter renders the construction of the first-named style of mechanism too light to afford the necessary strength to the several parts. In the first-named mode of construction or arrangement the friction is applied at or near the hub of the pulley, while, in the second arrangement, the friction is applied by the same mechanism to the rim of the pulley. A single pulley, with my mechanism attached, operates in the same manner to stop or start motion.

The ring-segments and levers described and shown in this specification have been shown in pairs, but a single segment and lever may be substituted therefor, the principal object of using them in pairs being to equalize the action and render the wear of the several parts uniform. This mechanism is not confined in its application to pulleys, properly so called, but may, in the same manner, be attached to and operate gear-wheels.

The advantages I claim for my mechanism over any other known devices are the following: Its construction is simple, compact, and economical, and is not in any way liable to derangement. The wear of the several parts is reduced to a minimum, and is compensated for by means of the adjusting-screws, and does not necessitate the removal of the pulleys from their position on the shaft for adjustment. The pulleys can be placed very near each other, thus economizing space on the shaft. The action is positive and without jar or noise. It is applicable to all machinery requiring this mode of motion, from the most minute to the most extensive.

I am aware that the application of friction to the hub as well as to the periphery of a pulley is a common device for arresting and reversing its rotary motion, and I do not claim either application as any part of my invention. I am also aware that a split ring has been used in this connection, as in patent No. 157,063, and I do not claim or use any such device; neither do I claim the sleeve H, with or without its actuating-rod M, as they are both well-known devices.

What I claim as my invention, and desire to secure by Letters Patent, is—

1. The flanged bushing B, in combination with the ring-segments C C, substantially as and for the purposes specified.

2. The ring-regments C C, adjusted and secured as shown and described, in combination with the pulley A, as and for the purposes set forth.

3. The levers D D, with the adjusting-screws E E, in combination with the ring-segments C C, to operate substantially as shown, and for the purpose described.

4. The combination of the flanged bushing B, ring-segments C C, and levers D D, constructed and operated as and for the purposes specified.

EDWARD S. M. FERNALD.

Witnesses:
FERDINAND W. GUPTILL,
RICHARD L. K. GRANT.